United States Patent [19]
Furlan et al.

[11] Patent Number: 5,876,183
[45] Date of Patent: Mar. 2, 1999

[54] BLADE FOR ROTORS AND METHOD FOR PRODUCING ROTORS WITH SUCH BLADES

[75] Inventors: Roberto Furlan; Ulrich Knott, both of Munich; Horst Friedrich, Augsburg, all of Germany

[73] Assignee: MTU Motoren- und Turbinen-Union Muenchen GmbH, Munich, Germany

[21] Appl. No.: 45,161

[22] Filed: Mar. 19, 1998

Related U.S. Application Data

[62] Division of Ser. No. 744,995, Nov. 7, 1996, Pat. No. 5,797,182.

[30] Foreign Application Priority Data

Nov. 11, 1995 [DE] Germany .................. 195 42 080.2

[51] Int. Cl.[6] ................................................ F01D 5/30
[52] U.S. Cl. .................................. 416/213 R; 416/233
[58] Field of Search ........................ 416/213 R, 213 A, 416/233, 234, 229 R, 229 A, 241 R; 29/889.72, 889.21, 889.22, 458, 527.1, 428; 228/193, 186

[56] References Cited

U.S. PATENT DOCUMENTS

| | | |
|---|---|---|
| 3,566,493 | 3/1971 | Poucher et al. ........................ 416/233 |
| 3,627,443 | 12/1971 | Pirzer ...................................... 416/233 |
| 4,526,312 | 7/1985 | Goss et al. . |
| 4,704,066 | 11/1987 | Weissbacher ....................... 416/213 R |
| 4,784,573 | 11/1988 | Ress, Jr. . |
| 5,332,360 | 7/1994 | Correia et al. . |
| 5,429,877 | 7/1995 | Eylon ................................. 416/241 R |
| 5,511,949 | 4/1996 | Thore ................................. 416/213 R |
| 5,593,085 | 1/1997 | Tohill et al. . |

FOREIGN PATENT DOCUMENTS

| | | |
|---|---|---|
| 1007565 | 5/1957 | Germany . |
| 2510286 | 9/1976 | Germany . |
| 702740 | 1/1954 | United Kingdom ............... 416/213 R |

*Primary Examiner*—Christopher Verdier
*Attorney, Agent, or Firm*—W. F. Fasse; W. G. Fasse

[57] ABSTRACT

A blade for a rotor, especially a turborotor, is made of two hollow blade foot sections having matching seam surfaces to form a hollow blade with a thickened foot that is butt-welded with its blade foot sole (7) to an integral welding stub of a rotor hub or disk. The two hollow blade foot sections are soldered to each other along a radially outer seam section (5) between the seam surfaces and welded to each other along a radially inner seam section (6) between the seam surface. The radially inner seam section extends from said blade foot sole. The welded seam normally ends in the thickened blade foot section (6) and is thus shorter than the soldered seam section (5).

9 Claims, 2 Drawing Sheets

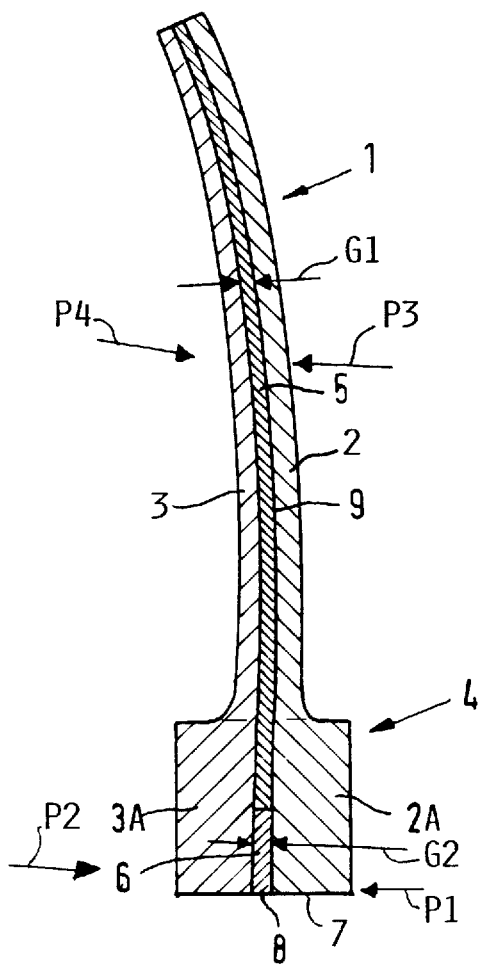
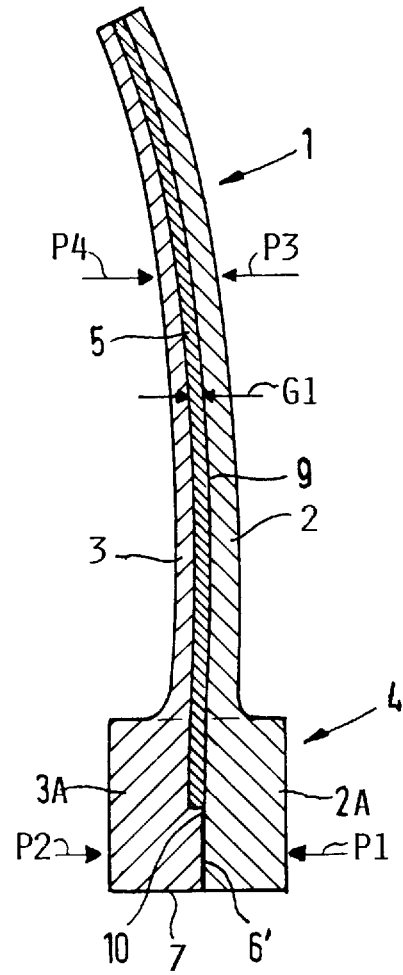

BLADE FOR ROTORS AND METHOD FOR PRODUCING ROTORS WITH SUCH BLADES

CROSS REFERENCE TO RELATED APPLICATION

The present application is a divisional application of our commonly assigned application U.S. Ser. No. 08/744,995, filed on Nov. 7, 1996 now U.S. Pat. No. 5,797,182.

FIELD OF THE INVENTION

The invention relates to a blade for rotors, particularly turborotors. The invention also relates to a method for producing such blades and rotors with hubs or disks to which the blades are butt-welded.

BACKGROUND INFORMATION

U.S. Pat. No. 4,784,573 (Ress, Jr.) issued on Nov. 15, 1988, describes a turbine rotor with hollow, air cooled rotor blades that are integrally secured to the rotor hub, for example, by diffusion bonding. The blades are thickened at their blade foot that is connected to the rotor hub, preferably to a slightly raised plateau forming an integral part of the hub. Diffusion bonding or welding as such is known from U.S. Pat. No. 4,526,312.

It is a disadvantage in the manufacture of rotor disks with integral blades that conventionally applied welding methods require a high pressure in order to provide the required frictional movement between the rotor blade and the welding stub or plateau on the rotor hub to accomplish friction welding for forming an integral unit in which the blade foot is butt-welded to the rotor hub. These conventionally required high pressures have made it difficult heretofore, if not impossible, to produce rotor disks with hollow blades integrally secured to the rotor hub because hollow rotor blades cannot withstand these high working pressures. Incidentally, rotors with hollow rotor blades integrally secured to the rotor hub are referred to in the relevant literature as BLISK.

It has been found that the above outlined problem becomes even more pronounced if it is intended to weld hollow blades made of two hollow blade sections or blade shell parts to the rotor hub. The blade sections are conventionally soldered to each other along their entire radial length, whereby the solder is provided between matching seam or joint surfaces of the two blade sections or shell parts. The blades are weakened, particularly in the blade foot area by the solder seam extending along the entire radial length of the respective hollow blade.

German Patent Publication 2,510,286 (Weiler et al.) published Sep. 16, 1976, discloses a method for producing a connection between a rotor hub or disk primarily made of steel with rotor blades primarily made of titanium. It is known in this connection to connect the blades to the hubs by soldering, electron beam welding, diffusion welding or friction welding. However, problems have been encountered in that the connection did not have the required strength presumably due to the formation of brittle phases, particularly in the area of the welding seam and presumably also due to the different heat expansions in response to the welding heat. Weiler et al. solve this problem by first blast welding a steel plate and a titanium plate to each other to form a two layer plate. Then the steel plate layer of the two layer plate is welded to the steel rotor hub or disk and the titanium plate layer is welded to the titanium blade of the rotor disk.

German Patent Publication 1,007,565 (Sedlmeir) published on May 2, 1957 discloses hollow turbine blades for gas turbines charged with a gaseous drive medium. The individual blades have a particular cross-sectional configuration which is so constructed that the hollow cross-section increases from the blade foot to the blade head or tip to such an extent that in this direction, namely the radial direction, the material cross-section of the blade tapers off to become smaller while achieving an increase in the total cross-section of the blade. As a result less strain is applied to the connection between the blade foot and the rotor hub, whereby the respective r.p.m. of the rotor may be increased. Particular problems with the connection between the blade and the rotor hub are not described, however such problems do exist as described above.

These problems become even more pronounced when the individual hollow rotor blades are assembled of two matched blade sections or blade shell parts. Conventional welding operations have not succeeded in securely attaching such hollow two-section blades to the rotor hub. The joining seam which is normally made of solder is ripped open particularly in the blade foot area particularly in the butt-welding area between the blade foot sole and the blade foot welding stub or plateau.

OBJECTS OF THE INVENTION

In view of the above it is the aim of the invention to achieve the following objects singly or in combination:

to provide a method for the manufacture of rotor disks with integral hollow two section blades, whereby such blades can be secured to the rotor hub with the required strength without adversely affecting the connection between the two blade sections;

to construct hollow two section blades which are suitable for butt-welding of the blade foot to welding stubs or plateaus on the rotor hub;

to provide a manufacturing method which permits a mass production of turborotors at low costs;

to assure a reliable welding joint between the hub and the blade foot and in the blade foot sections while permitting the use of relatively low joining pressures;

to optimally reduce the ratio between the weight of the hollow rotor blades to their volume;

to apply different joining pressures to different areas of the blade and hub blade junctions;

to substantially reduce rejects in the manufacture of turborotors with hollow blades; and to apply to each area of the parts to be joined such pressure that the particular part will not be adversely stressed nor warped.

SUMMARY OF THE INVENTION

A hollow blade for rotor disks, especially turborotor disks, is suitable for butt-welding to a rotor hub and is characterized according to the invention by a thickened blade foot having a radially inner blade foot sole for butt-welding to a turborotor disk or hub. First and second blade sections having matching seam surfaces are fitted to each other to form the hollow blade having a radially inner blade portion including at least part of the thickened blade foot and a radially outer blade portion extending radially outwardly from the radially inner portion. A joining seam between the two blade sections comprises a radially outer soldered seam section (5) in the outer blade portion and a radially inner welded seam section (6) extending from the radially outer seam section (5) to the radially inner blade foot sole (7) of the thickened blade foot (4).

The above described hollow blades of the invention are used in a method of manufacturing a rotor disk having a rotor hub with the hollow rotor blades butt-welded to the rotor hub, whereby the hollow rotor blades include first and second blade sections having seam surfaces fitted to each other, wherein according to the invention the following steps are performed. First, the hollow blades are produced by making first and second blade sections as hollow shell parts each with a thickening in its blade foot area and with seam surfaces mutually matched to the respective other shell part. Then, solder is applied to a radially outer seam section of the seam surface of at least one shell part while leaving a radially inner seam section of the seam surface free of solder. Then, the shell parts or first and second blade sections are fitted and joined to each other along the seam surfaces by pressing the first and second blade sections together with a first pressure along the radially outer seam section and with a second pressure along the radially inner seam section to form the hollow rotor blades. Next, the rotor hub is produced with integral welding stubs or welding plateaus for welding the hollow rotor blades with their radially inner blade foot sole to these stubs or plateaus. The blade foot soles are then butt-welded to the respective integral welding stub or plateau. Finally, the blades are machined particularly along the thickened blade foot to finished contours of the hollow rotor blades to form the rotor disk with integral hollow rotor blades.

According to the invention the soldered junction or seam between the shell parts of the hollow blade no longer reaches into the area of the butt-welded seam between the blade foot sole and the rotor hub. Rather, a substantially homogeneous volume of the material of which the first and second hollow blade sections are made, is welded to the rotor hub, or rather to the welding stub or plateau of the rotor hub, whereby the soldered seam is not influenced by the pressures used for welding of the blade to the rotor hub. The entire radially outer area of each hollow blade is formed by joining the blade sections or shell parts with an economical, yet exact soldering method. Only a minimally narrow strip of the joining seam in the foot area next to the blade foot sole is not soldered but is welded. Such narrow strip has a radial width of about 3 to 15 mm in which the joining seam is welded. This narrow strip is preferably positioned in the area of the thickened blade foot providing an enlarged blade foot sole. The thickened blade foot with its enlarged blade foot sole is advantageous for several reasons compared to respective conventional rotors. First, it is particularly suitable for performing a butt-welding operation, especially a friction welding of the blade to the hub. Second, the enlarged blade foot sole permits properly positioning the blade on the hub. Third, the enlarged blade foot sole permits properly holding the components in place. The thickened blade foot areas of each blade section or shell part have, compared to the relatively thin-walled radially outer blade portions, a sufficient strength due to their larger thickness for pressing these blade foot portions toward each other in the area of the welded joining seam extending over the above mentioned relatively narrow width. If the surface area of the welded joining seam in the blade foot is substantially smaller than the surface area of the blade foot sole, one achieves a reliable welded connection of the blade sections in the blade foot area with each other while applying a relatively small pressure which is less costly in its generation than high pressures. The cross-section through the blade foot of the hollow rotor blade is a homogeneous surface so that there is no distinction in the texture or phases of the materials in the welded joining seam and in the blade foot proper. This homogenous texture in the welded joining seam does not tear nor does it split nor does it form microfractures when subsequently the high butt-welding pressure is applied for integrally joining the thickened blade foot sole to the rotor hub or rather the welding plateau of the rotor hub.

Preferably, the welded joining seam in the radially inner portion of the blade or blade foot is formed by diffusion welding which as such is known. By keeping the welded joining seam minimal in its surface area compared to the entire joining seam surface areas of the two hollow blade sections, the costs for the joining are substantially reduced compared to conventional methods so that the present invention is particularly suitable for the mass production of rotors such as turborotors.

Preferably, the hollow blade sections or shell parts according to the invention are produced of a titanium base alloy having the advantage of a favorable density while simultaneously having a high strength which is particularly suitable for compressor rotors in turbopropulsion plants. The invention further reduces the ratio of weight to volume by making the hubs or disks also of titanium base alloys which, combined with hollow titanium base alloy rotor blades, provides a further improvement in the mentioned ratio. The invention also solves the problem of joining steel to titanium components since making the hub and the blades of titanium base alloys the formation of brittle intermetallic phases in the seams is prevented.

In order to provide a capillary gap for the soldering in the radially outer portion of the two blade sections it is preferable that a fitted welding foil is inserted in the gap for forming the welded joining seam. The welding foil is preferably made of the same material as the hollow blade sections. Such a fitted welding foil has additionally the advantage that the formation of microfractures in the transition area between the radially outer soldered portion of the seam and the radially inner welded portion of the seam is prevented during the joining.

The method according to the invention has the advantage that for the first time the joining of hollow blade sections or shell parts to each other and the joining of the hollow blades to the hub is reliably repeatable without a high number of rejects. The combination of the various steps and/or features of the invention take into account their economic justifiability in combination with their technological reliability. It has been found that a welded seam in the radially inner portion of the blade foot and a welded seam preferably a butt-welded seam, between the blade foot sole and the rotor hub assure that the enormous centrifugal forces to which the rotor blades of this type are exposed in operation, are transmitted primarily through the welding seams and only secondarily through the soldered seams. For the welding in the thickened blade foot areas of the blade sections to each other and of the blade foot sole to the hub, it is possible to use different methods provided these methods permit a surface area type of joining of the hollow blade sections or shell parts to each other to form a hollow rotor blade.

It is especially advantageous if the welding method applied in the radially inner portion is coordinated to the soldering method in the radially outer portion so that both steps can be taken simultaneously at the same temperature while applying different pressures in different zones of the blade so that the soldered seam section (5) and the welded seam section (6) are formed simultaneously. For this purpose preferably thermal compression welding is selected because the parameters thereof such as the temperature and pressure can be coordinated to the requirements of the soldering. Especially diffusion welding is suitable in this context. Diffusion welding provides an area type of butt-welding in the radially inner area and a soldered seam in the radially outer area of the seam, whereby the soldered seam is filled with solder. Diffusion welding further has the advantage of a high texture quality in the welded seam and in the blade foot portions next to the seam.

In a preferred performance of the present method the pressure applied for welding the radially inner seam between the first and second blade sections is substantially larger than the pressure applied for soldering the seam in the radially outer portion. The welding pressure is preferably larger than the soldering pressure by at least one order of magnitude such as 10:1. This application of different pressures for the welding and soldering assures that on the one hand the shell parts forming the hollow blade sections are not adversely stressed nor warped, nor otherwise adversely loaded while on the other hand simultaneously the proper welding is assured in the radially inner area.

Preferably the above mentioned welding foil is inserted prior to the welding step in the radially inner seam area or gap between the blade sections, whereby the welding foil is made of the same material as the blade sections. By making the welding foil of the same material as the blade sections it is assured that a soldering gap is formed between the radially outer blade sections and that the width of this soldering gap is determined by the thickness of the welding foil. Thus, the capillary action in the soldering gap can be controlled and the respective capillary forces uniformly distribute the solder in the radially outer soldering gap to form a uniformly soldered seam. The solder is preferably also formed as a soldering foil or as a coating on at least one of the joining seam surfaces forming the soldering gap.

In another embodiment of the invention a shoulder is formed in the blade foot of at least one blade section whereby the welding foil can be kept relatively thin while making the soldering gap sufficiently wide for the soldering in the radially outer soldered seam. Although one shoulder formed in the thickened foot section of at least one of the blade sections is satisfactory, each blade foot section may have a shoulder and these shoulders may overlap while still providing the soldering gap width required for a uniform distribution of the solder material by capillary action.

The blade foot sole is preferably secured to the rotor stubs or welding plateaus by friction welding to form a butt-welding which was not possible heretofore with hollow rotor blades.

BRIEF DESCRIPTION OF THE DRAWINGS

In order that the invention may be clearly understood, it will now be described, by way of example, with reference to the accompanying drawings, wherein:

FIG. 2 is a longitudinal, radial section along section line II—II of the hollow rotor blade of FIG. 1 illustrating a first embodiment of the invention in which the soldering gap and the welding gap have approximately the same width; and FIG. 3 shows a sectional view similar to that of FIG. 2, however illustrating a soldering gap having a width larger than the width of the gap for a welding seam.

Figure 1:
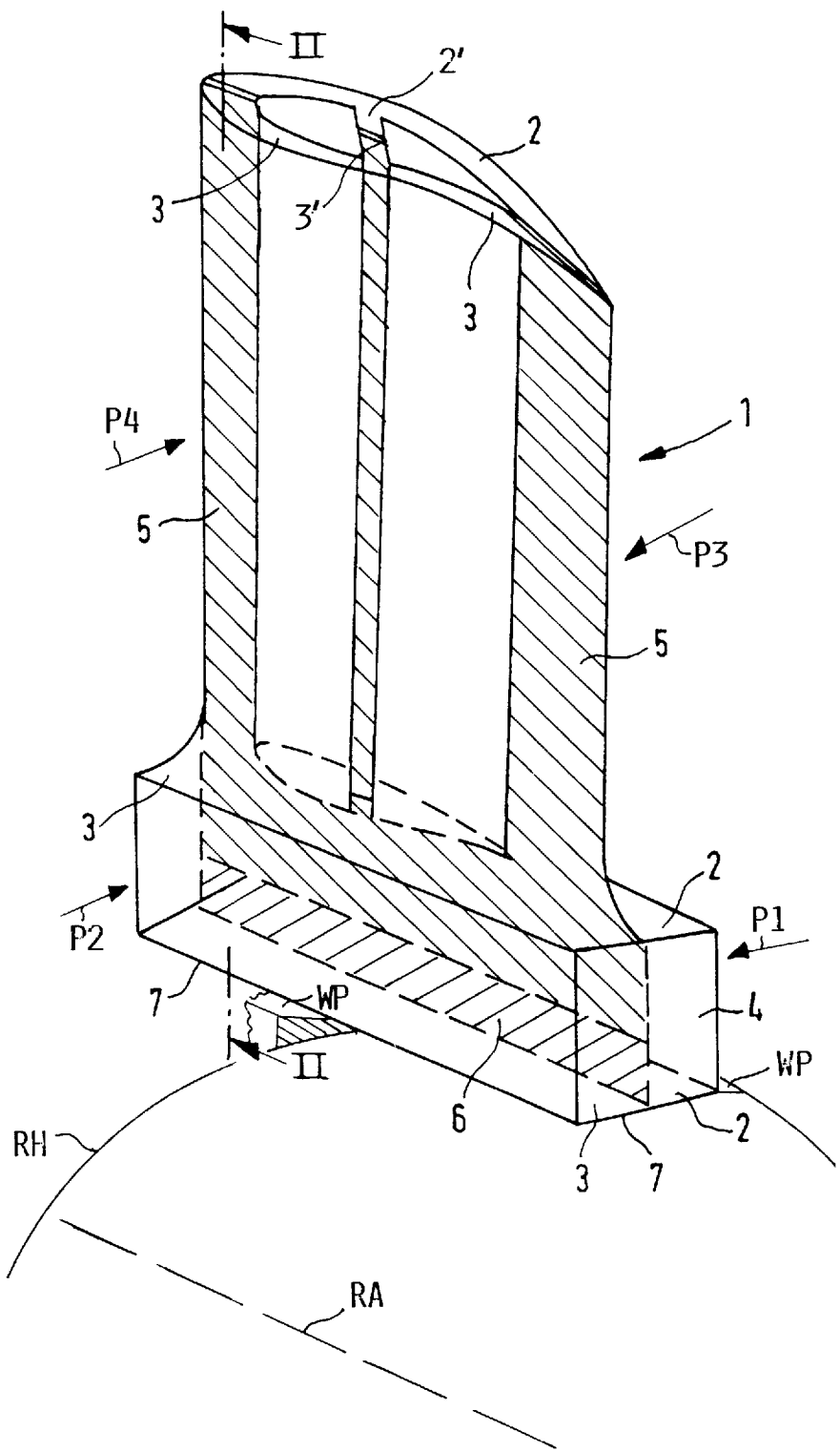
FIG. 1 is a perspective partially sectional view of a hollow rotor blade according to the invention whereby the section extends approximately in a radial plane.

DETAILED DESCRIPTION OF PREFERRED EXAMPLE EMBODIMENTS AND OF THE BEST MODE OF THE INVENTION

FIG. 1 shows a section through a hollow rotor blade 1 assembled of two matched hollow blade sections or blade shells 2 and 3. The blade 1 is especially constructed for use in a rotor for turbopropulsion plants, whereby the blades become an integral part of the respective rotor disks since the blades are welded to the rotor hub. The blade or shell sections 2 and 3 have respective inner reinforcing ribs 2' and 3' reaching into the hollow volume of the blade 1. According to the invention, the first and second blade sections 2 and 3 are soldered to each other in a joining seam section 5 extending radially outwardly of a radially inner welded seam section 6. The term "radially outwardly" and "radially inwardly" has reference to a rotational axis RA of a rotor hub or disk RH to which a thickened blade foot 4 is welded with its blade foot sole 7 on a welding plateau or stub WP. The hub RH and stub WP are shown only symbolically. The radially inner welding seam 6 reliably prevents a fracture of any soldered joining seam between the blade sections 2 and 3 when welding the thickened blade foot 4 to the rotor hub RH to provide the latter with integral rotor blades. It has been found that such fractures are reliably prevented by the radially inner welding seam 6 even if the connection of the foot sole 7 to the stub or plateau WP involves a butt-welding between the sole 7 and the stub or plateau WP.

It will be noted that the radial length or width of the welding seam 6 extends only partially into the thickened blade foot 4 and is substantially shorter in the radial direction than the radial length of the soldered seam 5. Since the surface area of the welded seam 6 is substantially smaller than the respective sectional surface area of the thickened blade foot 4, it is possible to use substantially smaller lateral pressures indicated by the arrows P1 and P2 than heretofore in order to produce the welded radially inner seam section 6. A thermal compression welding operation such as diffusion welding is suitable for forming the radially inner welding seam 6. The formation of the welding seam 6 takes place preferably simultaneously with the formation of the radially outer soldered seam section 5 between the sections 2 and 3. The soldering takes place substantially by capillary action in the gap G1 shown in FIG. 2. The soldering is accomplished by applying substantially smaller pressures P3 and P4 compared to the welding pressures P1 and P2. This feature of the invention has the advantage that the hollow blade sections 2 and 3 are not deformed, nor adversely stressed, nor warped, nor mechanically overloaded in any other way.

The sectional view of FIG. 2 along section line II—II in FIG. 1 shows a first embodiment of the invention, wherein solder 9 is held in the gap G1 and welding seam material such as a welding foil 8 is held in the gap G2 for forming the radially inner welding seam 6. The welding foil 8 is made of the same materials as the hollow blade sections 2 and 3. The welding foil 8 has a thickness conforming to the width of the gap G2 and makes sure that the gap G1 is provided for receiving the solder 9. The width of the gap G1 is such that a proper soldering by capillary action is assured, whereby the gap G1 is uniformly filled with the solder melt 9.

FIG. 3 illustrates a view similar to that of FIG. 2, however with a welded radially inner joining seam 6' substantially narrower than the width of the gap G2 in FIG. 2. This is possible due to the shoulder 10 which provides for the gap G1 to be filled with solder 9 by capillary action. The shoulder 10 extends substantially in parallel to the rotational axis of the rotor toward the seam 6'. This shoulder 10 is provided in at least one of the blade sections 2 or 3. As shown, the shoulder 10 is provided in the thickened portion of the blade section 3 as part of the thickened blade foot 4. In the embodiment of FIG. 3 the horizontal or axial width of the shoulder 10 determines substantially the width of the gap G1 which must be sufficient for the capillary action of the melted solder to form a proper radially outer, uniformly soldered seam 5.

The just described hollow blades 1 according to the invention are used in the present method for manufacturing rotor wheels, particularly turbowheels by performing several steps. First, the blade sections or shell parts 2, 3 are produced each with a thickened foot section 2A, 3A to form the thickened blade foot 4. In this production step the joining surfaces that form the gaps G1 and G2 are machined or milled to provide a precise fit between the two blade sections 2 and 3.

Next, solder is applied to at least one of the two seam forming or joining surfaces forming the gap G1. Care is taken that no solder enters into the gap G2 where the welding seams 6 will be formed. If the hollow blades 1 are made of a titanium alloy, the solder material 9 is preferably a layered sandwich foil with outer foil plies made of pure titanium and an intermediate ply of copper alloys. Preferred copper alloys include copper nickel alloys or copper nickel zirconium alloys for forming the intermediate ply. The thickness of the titanium outer plies and the thickness of the copper alloy inner ply are so selected or coordinated to each other that subsequent to the soldering the solder will have the following composition:

Ti70/Cu15/Ni15 or Ti60/Cu20/Ni20, or

Ti35/Zr35/Cu15/Ni15; or Ti58/Cu20/Ni20/Pd2.

In a test sample a sandwich solder foil having the first mentioned composition was used:

Ti70/Cu15/Ni15 as solder material which was applied to one seam surface forming the gap G1. The solder sandwich foil is kept in place initially in the radially outer soldered seam 5 by tacking the solder sandwich to the surface by means of capacitor discharge welding. Similarly, a welding foil 8 is tacked to one of the surfaces of the two thickened foot sections that form the radially inner welding gap G2. If the blade sections are made of a titanium alloy, the welding foil 8 will also be a titanium alloy. Both, the welding and the blade sections 2, 3 will have the same titanium alloy composition.

Once the soldering foil 9 and the welding foil 8 have been tacked in place, the two hollow sections or shell parts 2 and 3 are precisely fitted to each other and then joined by soldering and welding, preferably simultaneously. According to the invention, the soldering pressure P3, P4 can be substantially smaller than the welding pressure PI, P2. In the example embodiment the different pressures are mechanically applied. The thickened foot 4 in the area of the welding seam 6 or 6' makes it possible that the applied welding pressure P1, P2 is larger than the soldering pressure P3, P4 by at least one order of magnitude. The welding pressure is applied to a cross-sectional area of the seam 6 which begins at the blade foot sole 7 and extends radially outwardly within the range of about 3 to about 15 mm along the joining surfaces forming the gap G2 for the welding material 8. An example soldering pressure P3, P4 is, for example 0.1N/mm$^2$ in the radially outer soldered seam 5 and about 1N/mm$^2$ in the welding seam 6. The mechanical pressure application device is so configured with its clamps that the blade sections 2 and 3 can be held with a proper fit in the pressure application device.

Thereafter, while the contact pressure just described is being maintained, the clamped blade sections with the soldering and welding foils inserted in the respective gaps is heated in a vacuum oven to a temperature within the range of 850° C. to 1050° C. for a duration of about 0.5 to 5 hours until the present hollow rotor blade 1 is properly formed by joining the sections 2 and 3 by the radially outer soldered seam 5 and by the radially inner welded seam 6, 6' as described.

Thereafter, a plurality of hollow blades 1 are secured to the rotor hub RH on welding stubs or welding plateaus WP shown in FIG. 1. These plateaus WP are uniformly distributed around the circumference of the rotor hub RH and the connection between these plateaus WP and the blade foot sole 7 is performed by friction-welding to form a butt-welding in an automat to provide an integral structure of the hub and blades.

In the last step, the thickened blade foot portions 2A, 3A are machined to the desired final contour. Prior to this final machining step, the thickened portions 2A, 3A that form the thickened blade foot 4 are suitable not only for the purpose of applying the pressures P1 and P2, but also for the butt-welding between the sole 7 and the plateaus WP. The final machining is performed by a milling operation.

Although the invention has been described with reference to specific example embodiments, it will be appreciated that it is intended to cover all modifications and equivalents within the scope of the appended claims.

What is claimed is:

1. A blade for a rotor having butt-welded blades integrally secured to a hub or disk, said blade comprising a thickened blade foot (4) having a radially inner blade foot sole (7) for butt-welding to said hub or disk (RH), a first blade section (2) and a second blade section (3) having seam surfaces fitted to each other to form said blade as a hollow blade having radially inner blade portions including at least part of said thickened blade foot (4) and radially outer blade portions, a joining seam between said two blade sections, said joining seam comprising a radially outer soldered seam section (5) and a radially inner welded seam section (6, 6') extending from said radially outer soldered seam section (5) to said radially inner blade foot sole (7) of said thickened blade foot (4).

2. The blade of claim 1, wherein said radially inner welded seam (6, 6') is a diffusion welded seam (6).

3. The blade of claim 1, wherein said first and second blade sections (2, 3) are made of a titanium base alloy.

4. The blade of claim 1, further comprising a welding foil (8) made of the same material as said first and second blade sections (2, 3), said welding foil (8) being fitted in said radially inner welded seam section (6) between said first and second hollow blade sections (2, 3).

5. The blade of claim 1, further comprising a shoulder (10) between said first and second blade sections (2, 3), said shoulder (10) extending between said soldered seam section (5) and said welded seam section (6, 6').

6. The blade of claim 1, wherein said welded seam section (6) extends from said radially inner blade foot sole (7) radially outwardly only partly into said thickened blade foot (4).

7. The blade of claim 1, wherein said soldered seam section (5) and said welded seam section (6) have approximately the same seam thickness.

8. The blade of claim 1, wherein said soldered seam section (5) and said welded seam section (6) have different seam thicknesses.

9. The blade of claim 1, wherein said soldered seam section (5) extends partly into said thickened blade foot (4).

* * * * *